United States Patent
Bolotski et al.

(10) Patent No.: US 11,206,089 B2
(45) Date of Patent: Dec. 21, 2021

(54) MITIGATING INTERFERENCE BETWEEN WIRELESSLY CONTROLLED MACHINES USING RF SHIELDING

(71) Applicant: Amazon Technologies, Inc., Seattle, WA (US)

(72) Inventors: Josephine Ammer Bolotski, Seattle, WA (US); Emilia S. Buneci, Seattle, WA (US); Sachin Rajendra Kothari, Issaquah, WA (US); Unnikrishnan Vadakkanmaruveedu, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/102,013

(22) Filed: Nov. 23, 2020

(65) Prior Publication Data

US 2021/0075521 A1    Mar. 11, 2021

Related U.S. Application Data

(62) Division of application No. 16/000,772, filed on Jun. 5, 2018, now Pat. No. 10,880,018.

(51) Int. Cl.
| | |
|---|---|
| *H04B 1/00* | (2006.01) |
| *H04B 15/02* | (2006.01) |
| *G08C 17/02* | (2006.01) |
| *B25J 19/06* | (2006.01) |
| *B25J 9/16* | (2006.01) |
| *B25J 9/00* | (2006.01) |

(52) U.S. Cl.
CPC .......... *H04B 15/02* (2013.01); *B25J 9/0084* (2013.01); *B25J 9/1689* (2013.01); *B25J 19/06* (2013.01); *G08C 17/02* (2013.01); *Y10S 901/49* (2013.01)

(58) Field of Classification Search
CPC .......... H04B 15/02; H04B 1/005; H04B 1/10; H04B 1/1027; G08C 17/02; G07C 5/00; G07C 2301/00; B25J 9/0084; B25J 9/1689
See application file for complete search history.

(56) References Cited

U.S. PATENT DOCUMENTS

| | | | |
|---|---|---|---|
| 7,861,844 B2 * | 1/2011 | Hayduchok | B07C 7/02 198/370.1 |
| 2004/0217760 A1 * | 11/2004 | Madarasz | G01R 33/563 324/307 |
| 2017/0196128 A1 * | 7/2017 | Elizondo, II | H01L 23/552 |

* cited by examiner

*Primary Examiner* — Tuan Pham
(74) *Attorney, Agent, or Firm* — Patterson + Sheridan, LLP

(57) ABSTRACT

Embodiments herein describe a system that includes a first Faraday cage defining a first aperture through which a first conveyor extends, a first wirelessly controlled machine disposed in the first Faraday cage, where the first wirelessly controlled machine is configured to transmit control signals using a first frequency range, a second Faraday cage defining a second aperture through which a second conveyor extends, and a second wirelessly controlled machine disposed in the second Faraday cage where the first wirelessly controlled machine is configured to transmit control signals using the first frequency range. Further, a portion of at least one of the first Faraday cage and the second Faraday cage is disposed between the first and second apertures.

20 Claims, 8 Drawing Sheets

MITIGATING INTERFERENCE BETWEEN WIRELESSLY CONTROLLED MACHINES USING RF SHIELDING

CROSS-REFERENCE TO RELATED APPLICATIONS

This application is a divisional of co-pending U.S. patent application Ser. No. 16/000,772, filed Jun. 5, 2018. The aforementioned related patent application is herein incorporated by reference in its entirety.

BACKGROUND

Automation relies on machines to perform tasks such as transporting items between locations in a warehouse, assembling or manufacturing products, sorting items, packaging items, removing items from packaging, and the like. The machines may be controlled using wireless signals from a controller. Bandwidth becomes limited as more and more machines which rely on wireless control are spaced closer together. For example, to reduce the amount of occupied floor space (e.g., the footprint), a manufacturer or distributor may space the wirelessly controlled machines such that the wireless signals transmitted for controlling one machine can interfere with the wireless signals transmitted to another, neighboring machine.

To mitigate interference, the wireless signals transmitted to one machine may use a different wavelength (or range of wavelengths) than the wireless signals transmitted to another machine. In this manner, the machines can be allocated different portions of the bandwidth using non-interfering wireless signals. However, as the density of machines increases, the amount of bandwidth (e.g., the available wavelengths) becomes limited. Because of bandwidth constraints, the same wavelengths may be used to transmit controls to two different machines. If the signals transmitted to one of the machines reach the other machine, the signals can cause interference which prevents the other machine from reliably receiving the wireless signals intended for it.

DETAILED DESCRIPTION

Figure 1:
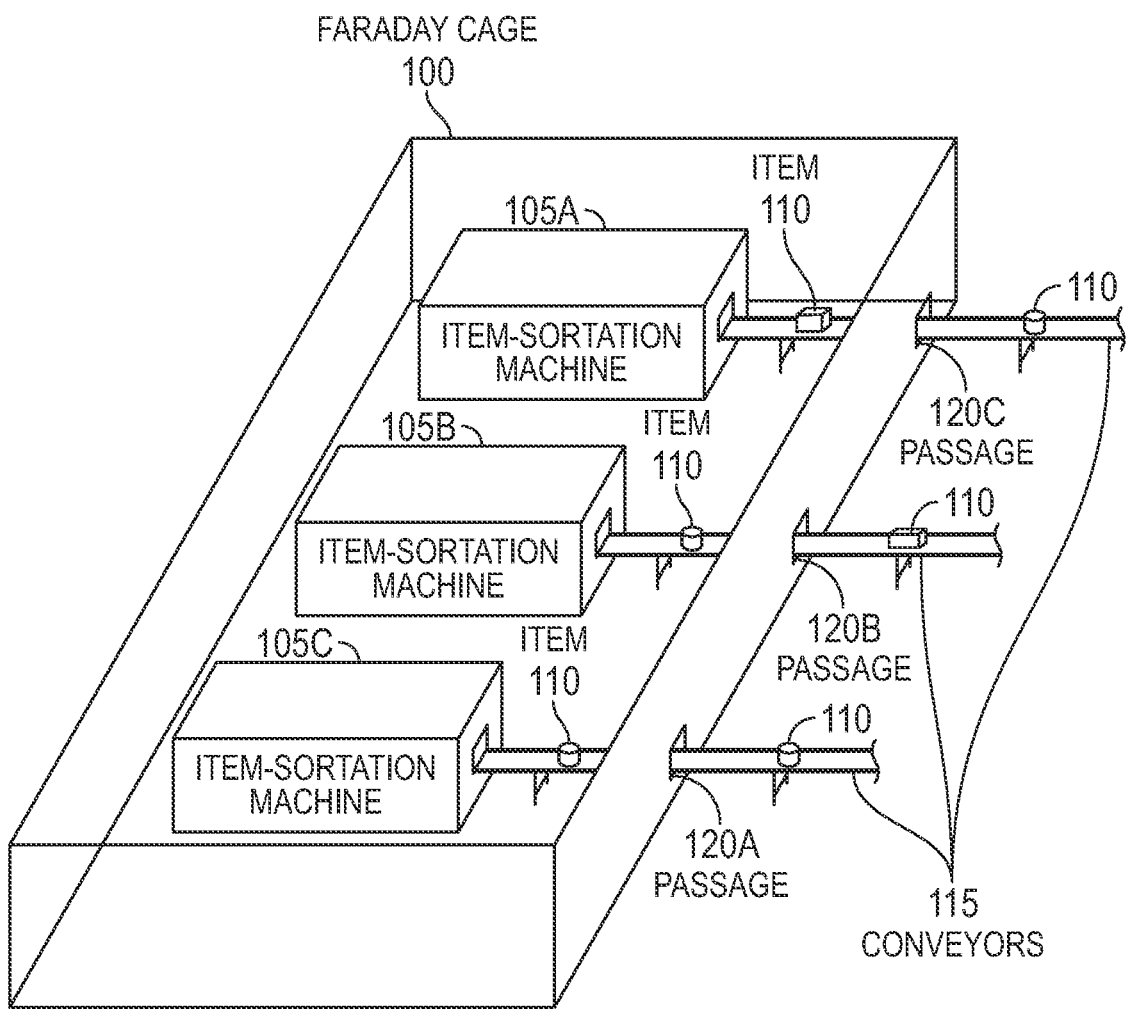
FIG. 1 illustrates a Faraday cage containing wirelessly controlled item-sortation machines, according to various embodiments.

Embodiments herein describe RF shielding techniques for mitigating interference between wirelessly controlled machines in a shared space—e.g., a warehouse or plant. As the density of the machines increases, the demand for bandwidth may also increase. For example, many wireless communication standards—e.g., IEEE 802.11a/b/g/n/ac/ad—provide different channels for allocating bandwidth within their defined frequency band (e.g., 2.4 GHz, 5 GHz, or 60 GHz). That is, the different channels may correspond to a different wavelength or range of wavelengths in the frequency band. For example, each channel in the 2.4 GHz frequency band is 20 MHz wide. Machines that use different channels in the frequency band can generally communicate without interfering with each other (although some portions of the channels may be overlapping). However, wireless signals in the 2.4 GHz and 5 GHz frequency bands can travel up to 100 feet. Moreover, different machines may require multiple channels to operate. If the channels have to be re-used (e.g., different machines use the same channels to communicate) and the machines are not spread far enough apart, then the wireless signals can interfere with each other and prevent the corresponding machines from reliably receiving the signals. However, spreading out the machines to prevent interference means that more floor space (e.g., a bigger footprint) is required to operate the machines which may increase costs. The wireless techniques described herein permit the machine density to be increased while mitigating the likelihood the wireless signals intended for one machine interfere with another machine.

To mitigate interference between neighboring machines, the machines may be assigned different channels within the same frequency band. For example, Machine A is assigned Channel 1, Machine B is assigned Channel 2, and so forth. However, there are a limited number of channels in each frequency band and some machines may require multiple channels further restricting the bandwidth. Thus, the channels may have to be reused which can result in interference if the machines are within wireless range of each other and transmit signals at the same time. For example, wireless signals for IEEE 802.11a/b/g/n/ac have a range up to approximately 100 feet. If machines currently transmitting data on the same channel in one of these IEEE frequency bands are within 100 feet of each other, the wireless signals can interfere.

In one embodiment, RF shielding techniques are employed to prevent the wireless signals transmitted from one machine from reaching another machine transmitting wireless signals using the same frequency range. For example, there may be insufficient bandwidth in a channel for two machines to share the same channel. If the machines are spaced closely together and transmit wireless signals at the same time, the wireless signals emitted by one machine may be received by the other, thereby causing interference. In one embodiment, one of the machines is placed in a Faraday cage which prevents it from transmitting wireless signals to, and receiving signals from, the other machine. The machines can then use wireless signals in the same frequency range. In one embodiment, the machines that use different channels relative to each other are grouped into a first Faraday cage while machines that use the same channels as the machines in the first Faraday cage can be placed in a second Faraday cage or allowed to transmit wireless signals freely (e.g., without being placed in a Faraday cage). In this manner, the multiple machines can reuse the same communication channels while being disposed close to each other in the shared space.

However, for machines tasked with sorting items, it may be difficult or impossible to create a Faraday cage that can completely surround the machine. For example, an item-sortation machine in a Faraday cage may receive packages on a conveyor which reaches the machine through a passage or aperture in the Faraday cage. The sorted packages (which can be stored in totes or other containers) can be transmitted out of the Faraday cage using a conveyor through the same aperture used when receiving packages or a different aperture. These apertures or passages permit the wireless signals emitted by the item-sortation machine to radiate out into the shared space. In one embodiment, instead of providing a conveyor for each machine in the Faraday cage, only one shared conveyor extends into the Faraday cage thereby reducing the number of apertures in the cage. A distribution system can be placed in the cage to permit the packages on the shared conveyor to be redirected to the appropriate machine. Further, neighboring Faraday cages can be arranged such that the respective passages in the Faraday cages for the conveyors are not in a facing relationship. That way, any signals radiating through the passage of one Faraday cage will strike (and be absorbed by) a side of a neighboring Faraday cage that does not have a passage. In this manner, the Faraday cages can be arranged to reduce or prevent radiation emitted from the passages in the cages from interfering with machines in neighboring cages.

FIG. 1 illustrates a Faraday cage 100 containing wirelessly controlled item-sortation machines 105, according to various embodiments. The Faraday cage 100 defines an enclosure that blocks electromagnetic fields from entering into the interior of the cage 100 and blocks electromagnetic fields generated in the interior of the cage 100 from exiting. In one embodiment, the Faraday cage 100 includes a plurality of surfaces (e.g., top, bottom, and sides) made from a material that absorbs RF signals. For example the Faraday cage 100 may be formed from a conductive material which forms mesh surfaces. However, the Faraday cage 100 can include any type of RF blocking or shielding material—e.g., a solid surface or mesh surfaces—which can be formed into any shape.

The Faraday cage 100 encloses the wirelessly controlled item-sortation machines 105. In one embodiment, the machines 105 transmit wireless signals that can interfere with other machines (not shown) disposed proximate to the Faraday cage 100. For example, the item-sortation machine 105A may transmit wireless signals using a first channel of a frequency band, while the machine 105B transmits wireless signals using a second channel of the frequency band and the machine 105C transmits wireless signals using a third channel of the frequency band (where the first, second and third channels are non-overlapping). Because the three machines 105 use three separate channels, the machines can transmit wireless signals at the same time with little or no wireless interference. However, there may be other wirelessly controlled machines disposed outside the Faraday cage 100 that may use some or all of wireless channels used by the machines 105 in the cage 100. The Faraday cage 100 prevents wireless signals emitted by the machines 105 in the cage 100 from reaching the wirelessly controlled machines outside the cage 100 and vice versa. Put differently, the wireless controlled machines in the cage 100 and outside the cage 100 are in wireless range of each other and wireless interference could result but for the RF blocking properties of the Faraday cage 100. In this manner, the machines in the cage 100 and out of the cage 100 are in isolated wireless transmission regimes. As such, the Faraday cage 100 can permit a greater density of the wireless controlled machines in a shared space without requiring the machines in wireless range of each other to use different frequency ranges.

As explained above, the Faraday cage 100 can include wirelessly controlled machines 105 that communicate using different frequency ranges (e.g., different channels in the same frequency band or different frequency bands). However, in another embodiment, the machines 105 may use the same frequency range (e.g., the same channel) so long as the machines 105 can share the frequency range. Put differently, the machines 105 may use only a portion of the bandwidth provided by a channel. Using predefined time slots (e.g., time multiplexing) or clear channel assessment, the machines 105 can share the same channel without causing interference. For example, in FIG. 1 it may be possible for the three machines 105 to use the same channel. By placing the three machines in the Faraday cage 100, other wirelessly controlled machines disposed outside the Faraday cage 100 can also use the same channel without causing wireless interference between the machines 105 in the cage 100 and the machines outside the cage 100.

The item-sortation machines 105 receive items 110 using conveyor 115. In FIG. 1, each item-sortation machine 105 has its own conveyor 115 which feeds the items 110 into the machines 105. The machines 105 can receive items from any type of conveyor whether the conveyor includes a belt, rollers, or wheels that may be powered or gravity driven. In one embodiment, the machines 105 include wirelessly controlled robots which move items 110 transported by the conveyors 115 and place them in one of a plurality of containers (e.g., totes). The containers may be mounted in the machines 105 or may be placed near the machines 105. When a container is full or should otherwise be replaced, a human associate or a robotic mover can place the tote on a conveyor that exits the Faraday cage 100. While FIG. 1 illustrates the conveyors 115 which transport items to the machines 105, the cage 100 can also include conveyors for transporting sorted items out of the cage. The Faraday cage 100 can include an egress conveyor for each machine 105 used to transport sorted items out of the cage 100 or one egress conveyor that is shared by the three machines 105. Further, the egress conveyors can use the same passages 120 as the conveyors 115 or the Faraday cage 100 may include different passages (which can be on the same side or a different side as the passages 120) used by the egress conveyors.

For the items 110 to reach the machines 105, the Faraday cage 100 includes respective passages 120 (or apertures) which permit the conveyors 115 to extend into the interior of the cage 100. The passages 120 may permit the RF signals emitted by the machines 105 to escape the Faraday cage 100 which can interfere with neighboring wirelessly controlled machines that, e.g., use the same frequency ranges as the machines 105 in the cage 100. That is, the Faraday cage 100 uses the passages 120 in order to permit items to efficiently reach the machines 105 using the conveyors 115, but the passages 120 weaken the RF shielding properties of the cage 100 by providing an area along the boundary of the cage 100 where RF signals emitted by the machines can escape and interfere with other machines.

The Faraday cage 100 can include a double door system that permits an associate enter and exit the cage 100 without allowing RF signals from the outside to enter in the cage 100 or RF signals generated by the machines 105 in the cage 100 to leave the cage 100. For example, associates may enter the cage 100 to move completed totes (which include sorted items) onto an egress conveyor, perform maintenance, or troubleshoot a problem with the machines 105. The double door system includes an exterior door, an interior door and an intermediate staging area. When entering the cage 100, the exterior door is opened which permits the associate to enter into the staging area. Because the interior door of the staging area is closed (which blocks RF signals), RF signals passing through the open exterior door cannot enter the interior of the cage 100 or exit the cage 100. Once the associate is in the staging area, the exterior door is closed and the interior door is opened permitting the associate to walk into the interior of the cage 100. Because the exterior door is closed, RF signals cannot enter in, or exit through, the Faraday cage 100. This process can be reversed when the associate leaves the cage 100.

Figure 2:
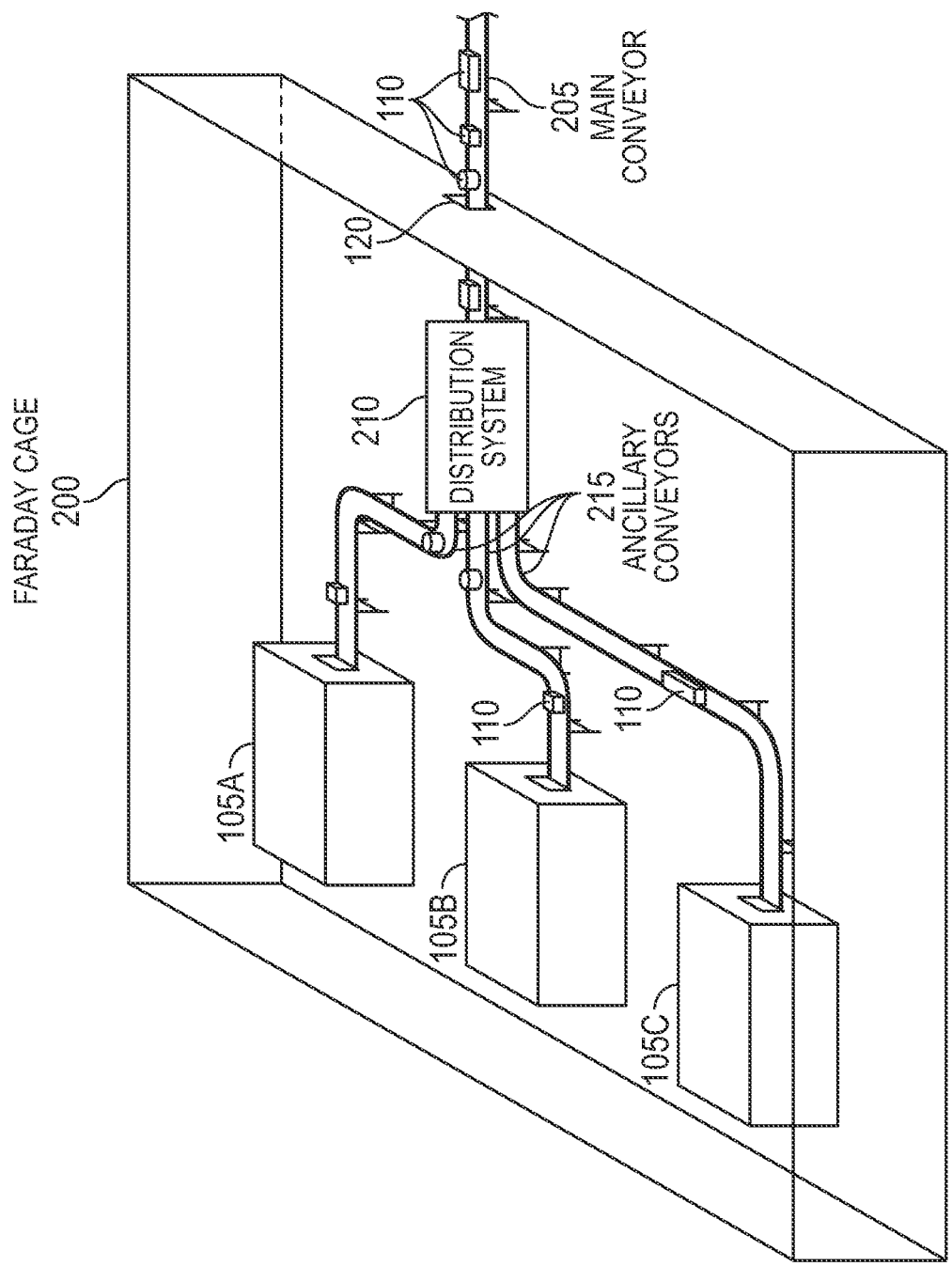
FIG. 2 illustrates a Faraday cage containing wirelessly controlled item-sortation machines, according to various embodiments.

FIG. 2 illustrates a Faraday cage 200 containing wirelessly controlled item-sortation machines 105, according to various embodiments. In this example, the Faraday cage 200 includes the same wirelessly controlled machines 105 as the Faraday cage 100 in FIG. 1 but uses a distribution system 210 to reduce the number of passages 120 in the cage 200. That is, instead of having three passages 120 as shown in FIG. 1, the Faraday cage 200 includes only one passage 120. The passage 120 permits a main conveyor 205 to extend into the interior of the cage 200 to deliver the items 110 to the distribution system 210.

The distribution system 210 separates the items 110 transported by the main conveyor 205 onto ancillary conveyors 215 which feed into a respective one of the machines 105. The distribution system 210 may include one or more actuators which move the items 110 received on the main conveyor 205 onto one of the ancillary conveyors 215. For example, the distribution system 210 may identify an ID corresponding to each of the items by, e.g., scanning bar codes on the items, reading RFID tags on the items 110, or using a computer vision system to identify a type of the items 110. Using the ID, the distribution system 210 can select which one of the ancillary conveyors 215 to move the item 110 onto. The distribution system 210 can push, lift, or roll the items 110 from the main conveyor 205 onto the selected ancillary conveyor 215. In other embodiment, the distribution system 210 may rely on an associate to move the items 110 from the main conveyor 205 onto one of the ancillary conveyors 215. For example, it may not matter which item-sortation machine 105 sorts the received items 110, in which case the associate can move the items 110 to the ancillary conveyor 215 corresponding to the machine 105 that is less busy.

Adding the distribution system 210 can reduce the number of passages 120 in the Faraday cage 200 relative to the Faraday cage 100 without the system 210. As such, the Faraday cage 200 may permit less of the RF signals generated by the machines 105 to escape, and permit less RF signals to enter relative to the Faraday cage 100.

In one embodiment, the Faraday cage 200 includes a distribution system (not shown) for moving sorted items out of the cage 200. The process may be reversed relative to the distribution system 210 in that when a tote is finished being loaded, an associate at the machines 105 can retrieve the totes and place them on respective ancillary conveyors which merge at a second distribution system within the cage 200. The second distribution system (which can be automatic or aided by an associate) moves the sorted items received on the ancillary conveyors to a main conveyor which exits the cage 200. The main conveyor can use the same passage 120 as the main conveyor 205 or use a different passage.

Figure 3:
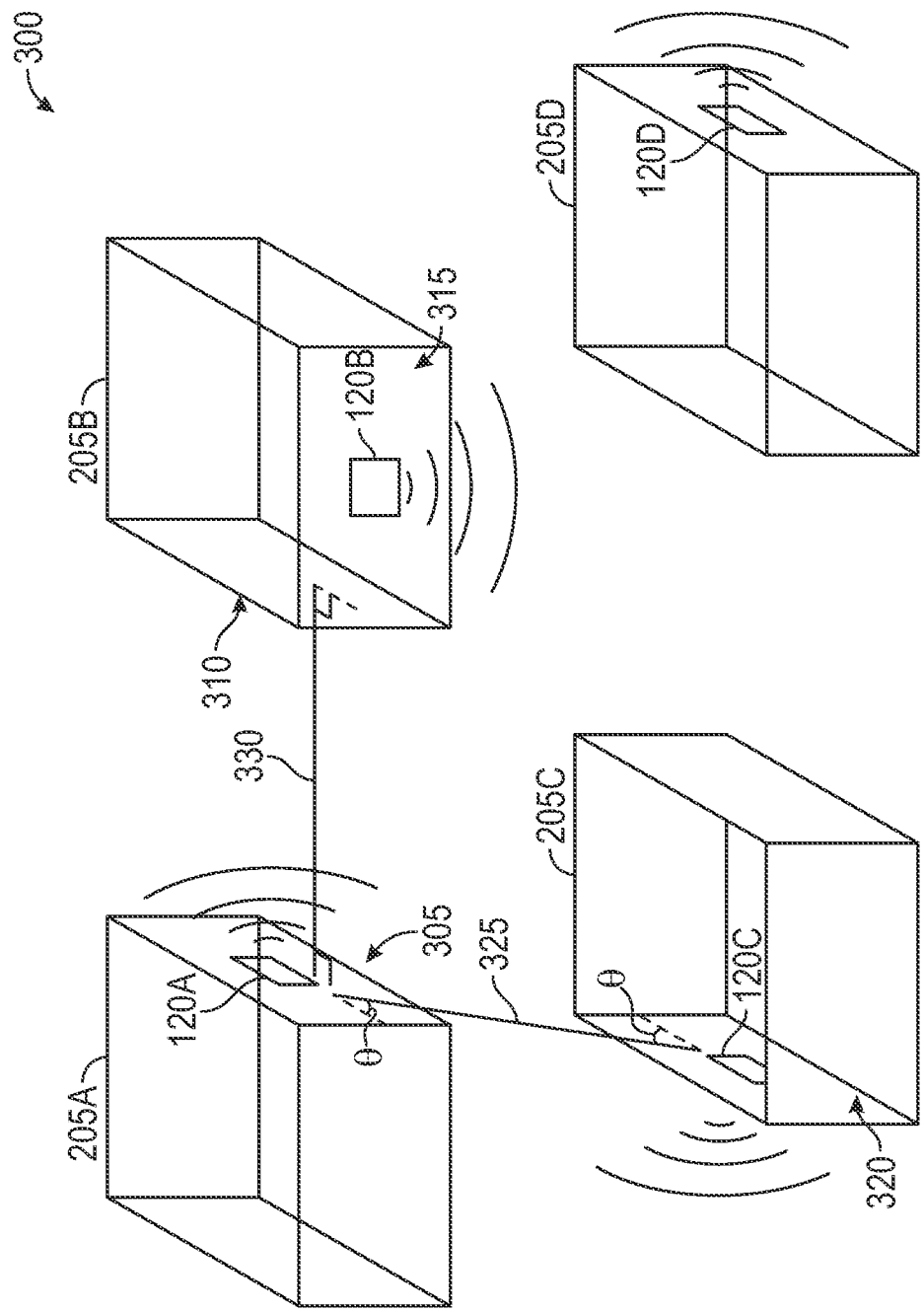
FIG. 3. illustrates multiple Faraday cages arranged to reduce wireless interference, according to various embodiments.

FIG. 3 illustrates multiple Faraday cages 205 arranged to reduce wireless interference, according to various embodiments. FIG. 3 illustrates an arrangement 300 or system of Faraday cages 205 where the cages 205 are positioned to mitigate the effects of RF signals passing through the passages 120 on wirelessly controlled machines in neighboring Faraday cages 205. In one embodiment, each of the Faraday cages 205 include one or more wirelessly controlled machines which can interfere with a machine in one of the other Faraday cages 205. That is, the machines in the Faraday cages 205 are within wireless range of each other such that the range of the antennas of the machines can reach the machines located in other Faraday cages 205. However, the Faraday cages 205 prevent the machines from interfering with each other when communicating using the same frequency range.

In one embodiment, each Faraday cage includes four machines where the four machines use the same four channels to communication. As discussed above, because the machines in the same Faraday cage 205 do not use the same channels, there is little to no wireless interference between the machines in the same cage 205. The Faraday cages 205 prevent the machines in one cage 205 from wireless interfering with the machines in another cage even though these machines are within wireless range of each other.

However, as shown, the passages 120 in the cages 205 permit the wireless signals generated by the machines in the cage to escape. In the examples above, the passages 120 can be used to move items into the cages 205 to be sorted; however, the embodiments are not limited to such. In other examples, the passages 120 may be used to move items out of the cages 205 using a conveyor or a track as discussed above. In generally, the arrangement 300 in FIG. 3 can be used in any application where the Faraday cages 205 include respective passages 120 (which can be continuously open or opened and closed at intervals). As mentioned above, the wireless signals generated by the machines in one of the Faraday cages 205 may interfere with the machines in another cage 205 by the wireless signals passing through the passage 120 in one cage and entering a neighboring Faraday cage 205 through another passage 120.

To mitigate the negative effects of interfering signals traveling through the passages 120, the Faraday cages 205 are arranged such that the side of the cage 205 containing a passage 120 does not face a side in a neighboring cage 205 that also has a passage 120. For example, the Faraday cage 205A includes a side 305 with the passage 120A in a facing relationship with a side 310 of the Faraday cage 205B which does not have a passage 120. As such, the wireless signals escaping through the passage 120A will primary strike the side 310 and be absorbed or reflected such that the wireless signals do not enter the Faraday cage 205B. This direct facing relationship is illustrated in FIG. 3 by axis 330 which extends between the side 305 and the side 310 and is perpendicular to these sides.

In this example, the passage 120B in the Faraday cage 205B is arranged on a side 315 which is perpendicular to the side 305 on the Faraday cage 205A thereby reducing the amount of interfering signals exiting the passage 120A from entering the passage 120B (and vice versa). In one embodiment, the passage 120B may be located on the side of the cage 205B opposite the side 310 or the side 315, thereby minimizing wireless interference between the machines in the Faraday cages 205A and 205B.

Moreover, the passages 120C and 120D in the Faraday cages 205C and 205D are disposed on sides that are not in a facing relationship with the side 315 that includes the passage 120B. As such, the amount of wireless interference between the machines in these cages 205 is reduced. In this example, the passages 120C and 120D are disposed on sides of the cages 205C and 205D that are perpendicular to the side 315. In one embodiment, the passages 120 can be disposed on any side of the cages 205C and 205D that has a non-facing relationship with the side of the neighboring cage that has a passage 120 such that a portion of one of the Faraday cages is disposed between the two passages 120.

Although FIG. 3 illustrates rectangular shaped cages 205, the cages 205 may also have one or more curved sides (e.g., a circular or elliptical shape). Regardless, the passages 120 can be arranged on the curved sides such that they are in a non-facing relationship, e.g., where a portion of one of the Faraday cages is disposed between the two passages 120.

Further, the Faraday cages 205 may be staggered as shown in FIG. 3. For example, rather than the Faraday cage 205C being directly below the cage 205A and the cage 205D being directly below the cage 205B, the cages 205C and 205D are staggered such that the cage 205C is at least partly between the cages 205A and the cage 205B and the cage 205D is to the right of the cage 205B. Doing so may further decrease the amount of wireless interference. In FIG. 3, the side 305 in the cage 205A is disposed to the left of a side 320 on the cage 205C which includes the passage 120C. In this example, the side 305 indirectly faces the side 320. Put differently, an axis (e.g., axis 325) that extends between the two sides 305 and 320 has a non-perpendicular angle (θ) relative to the two sides 305 and 320. The greater the lateral offset (i.e., the smaller than non-perpendicular angle), the smaller the relative line of sight profiles between passages 120A and 120C. Consequently, only small amounts of the wireless signals emitted from the passage 120A enter the passage 120C, and vice versa. Thus, staggering the Faraday cages 205 as shown can reduce the amount of wireless interference when the sides with passages indirectly face each other.

In one embodiment, the sides with the passages 120 that have indirect or direct facing relationships (e.g., sides 305 and 320 or sides 305 and 310) may emit wireless signals in different frequency ranges. For example, the machines in the Faraday cage 205A may use different channels than the machines in the Faraday cage 205C. As such, although the sides 305 and 320 indirectly face each other, any wireless signals passing through the passages 120A and 120C emitted by the other passage do not have a negative impact on the wirelessly controlled machines.

Figure 4:
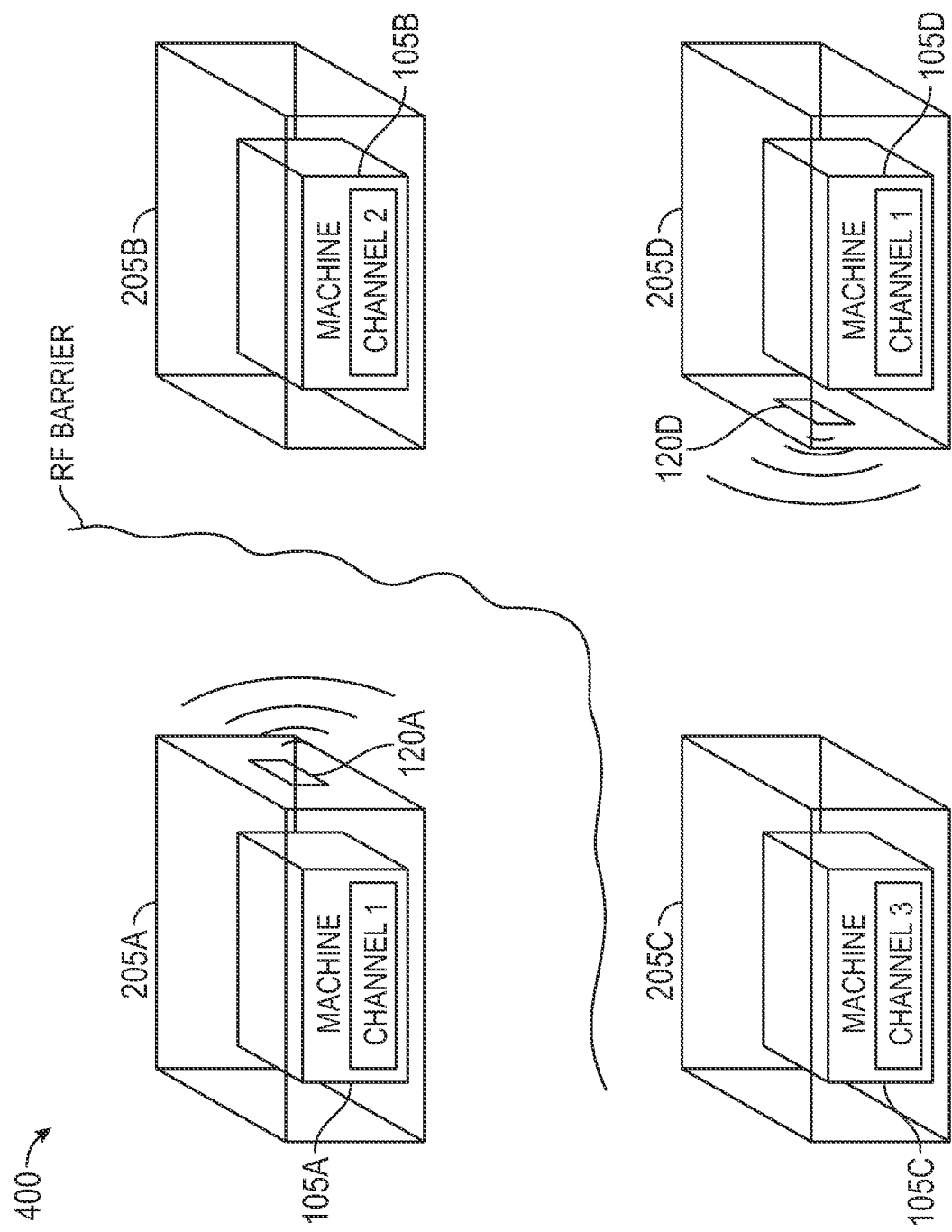
FIG. 4 illustrates multiple Faraday cages separated by a radio frequency (RF) barrier arranged to reduce wireless interference, according to various embodiments.

FIG. 4 illustrates multiple Faraday cages separated by a RF barrier 405 arranged to reduce wireless interference, according to various embodiments. FIG. 4 illustrates an arrangement 400 or system of Faraday cages 205 where the cages 205 are positioned to mitigate the effects of RF signals passing through the passages 120 on wirelessly controlled machines in neighboring Faraday cages 205. In this example, the Faraday cages 205A and 205D include respective wirelessly controlled machines 105A and 105D that operate using wireless signals transmitted on the same channel—i.e., Channel 1. In contrast, the Faraday cages 205B and 205C includes respective machines 105B and 105C that operate using different channels—i.e., Channels 2 and 3 (where Channels 1, 2, and 3 represent any three non-overlapping channels in a frequency band). As such, while the wireless signals emitted from by the machines 105A and 105D can interfere with each other, the wireless signals emitted by the machines 105B and 105C generally do not.

In FIG. 4, the passage 120A is in facing relationship with the passage 120D such that wireless signals can pass through, thereby potentially interfering with the machines 105A and 105D. Instead of arranging the Faraday cages 205A and 205D such that the passages 120A and 120D have non-facing relationships, the arrangement 400 includes a RF barrier 405 disposed between the passages 120A and 120D.

This barrier 405 absorbs or reflects away the wireless signals emitted from the passages 120A and 120D such that the signals cannot reach the machines 105A and 105D. In certain embodiments, the RF barrier 405 is a RF shielding curtain (e.g., a fabric curtain with interwoven electrically conductive material) which can be hung in a warehouse or a RF shielding fence that forms a rigid structure erected between the cages 205A and 205D.

Moreover, the RF barrier 405 may not prevent wireless signals emitted from passages in the cages 205B and 205C (not shown) from passing through each other. Put differently, the RF barrier 405 can be strategically located to be between cages 205A and 205D which contain machines 105A and 105D that operate using the same frequency range (e.g., Channel 1). The RF barrier 405 may not be between Faraday cages 205B, 205C, and 205D which have machines 105 using different frequency ranges—e.g., Channels 1, 2, and 3 which are non-overlapping.

Although FIG. 4 illustrates using the RF barrier 405 in combination with placing the machines in the Faraday cages 205, in other embodiments, the machines may not be disposed in the cages 205. That is, the RF barrier 405 may be sufficient to prevent interference between the machine 105A and the machine 105B when Faraday cages are not used in the arrangement illustrated in FIG. 4.

Figure 5:
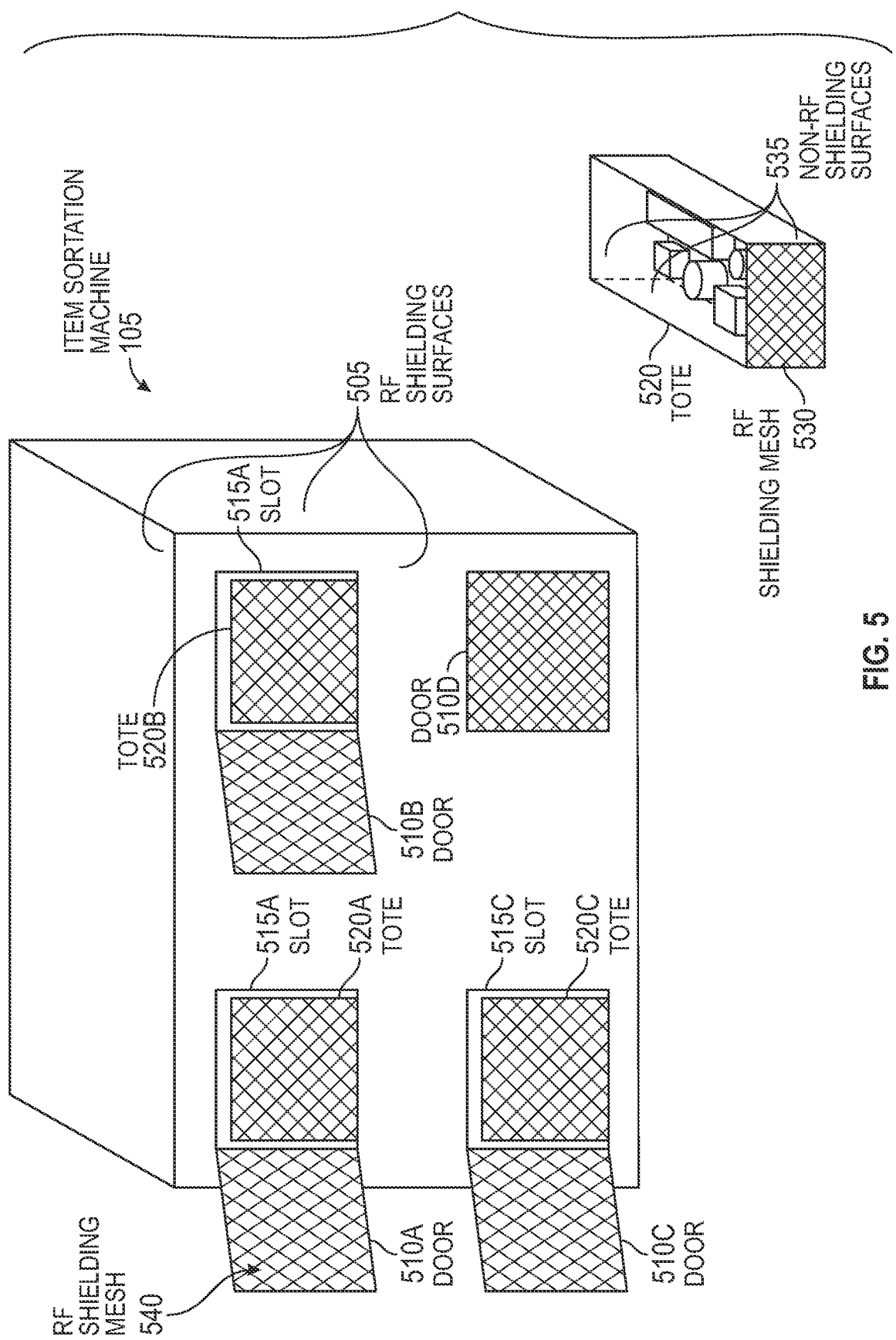
FIG. 5 illustrates RF shielding an item-sortation machine, according to various embodiments.

FIG. 5 illustrates RF shielding an item-sortation machine 105, according to various embodiments. In addition to putting the item-sortation machine 105 in a Faraday cage as discussed above, the machine 105 can have RF shielding which mitigates RF signals from leaking out that can cause interference with other wirelessly controlled machines. Put differently, placing RF shielding materials on the item sortation machine 105 that is disposed in the Faraday cages illustrated in FIGS. 1-4 can reduce the amount of wireless signals passing through the passage or passages in the cage. Moreover, the RF shielding on the machine 105 can reduce the likelihood that interfering signals entering the Faraday cage via a passage negatively impacts the machine 105. However, in another embodiment, the item-sortation machine 105 is not disposed in a Faraday cage. For example, the RF shielding techniques described below can be sufficient to protect the machine 105 from interfering signals (as well as prevent the RF signals emitted by the machine 105 from negatively impacting neighboring machines) when the machines 105 are not disposed in a Faraday cage. For example, the RF shielding techniques discussed in FIG. 5 can be combined with the RF barrier 405 discussed above in FIG. 4 where the RF barrier 405 is disposed between machines operating using the same frequency range.

The item-sortation machine 105 includes a plurality of RF shielding surfaces 505 which prevent wireless signals emitted by antennas in the machine 105 from exiting the machine as well as preventing wireless signals in the environment from entering into the machine 105 which could interfere with receivers in the machine (e.g., wireless controlled subsystems such as a robot). However, the machine 105 includes slots 515 which store totes 520 for receiving items sorted by the machine 105. For example, the machine 105 can include a feeder system which receives items that are then sorted into one of the totes 520. When a tote 520 is full or should otherwise be removed, an associate or a robot may remove the tote 520 and replace it with an empty tote 520. The slots 515 containing the totes 520 represent area of the machines 105 where interfering signals can exit or enter the machine 105.

To mitigate the negative impact of the slots 515, as shown, the totes 520 can include an RF shielding mesh 530 disposed on one side. That is, in this example, the totes 520 have one side with the RF shielding mesh 530 while the other sides are non-RF shielding surfaces 535. As a result, RF signals can pass through the non-RF shielding surfaces 535 easier than through the RF shielding mesh 530. When disposed in the slots 515, the totes 520 are disposed such that the RF shielding mesh 530 is disposed near the entrance of the slots 515 which mitigates the amount of wireless signals that can pass through the slots 515. That is, the RF shielding mesh 530 serves as a plug that fills the slots 515 (or apertures) thereby mitigating the amount wireless signals than can pass therethrough.

When a slot 515 is not being used, a door 510 can be closed by the associate or automatically upon detecting that a tote 520 has been removed. For example, the slots 515A, 515B, and 515C each store totes 520A, 520B, and 520C which may mean their respective doors 510A, 510B, and 510C are opened. However, the door 510D is closed indicating the corresponding slot is unused—e.g., a tote is not currently disposed at that location. Like the totes 520, the doors 510 include a RF shielding mesh 540 which block wireless signals from entering or exiting the machine 105. Thus, regardless of whether a slot 515 is filled by a tote 520 or covered by a door 510, the amount of wireless signals entering or exiting the machine 105 is reduced relative to a door 510 that does not include the mesh 540 or a tote 520 without the mesh 530.

Although FIG. 5 illustrates preventing interfering signals from passing through the machine 105 that has slots for holding totes 520, the same principle may apply to other types of passages in a wirelessly controlled machine. For example, the machine 105 may include a feeder where a conveyor belt brings an item to be sorted by the machine 105. The feeder may include an RF shielding curtain that hangs down that permits an item traveling on the conveyor belt to pass through but mitigates the amount of wireless signals that can pass through the feeder. Thus, the embodiments herein can be used with any machine that is designed to have passages which permit containers or items to enter or exit the machine.

Figure 6:
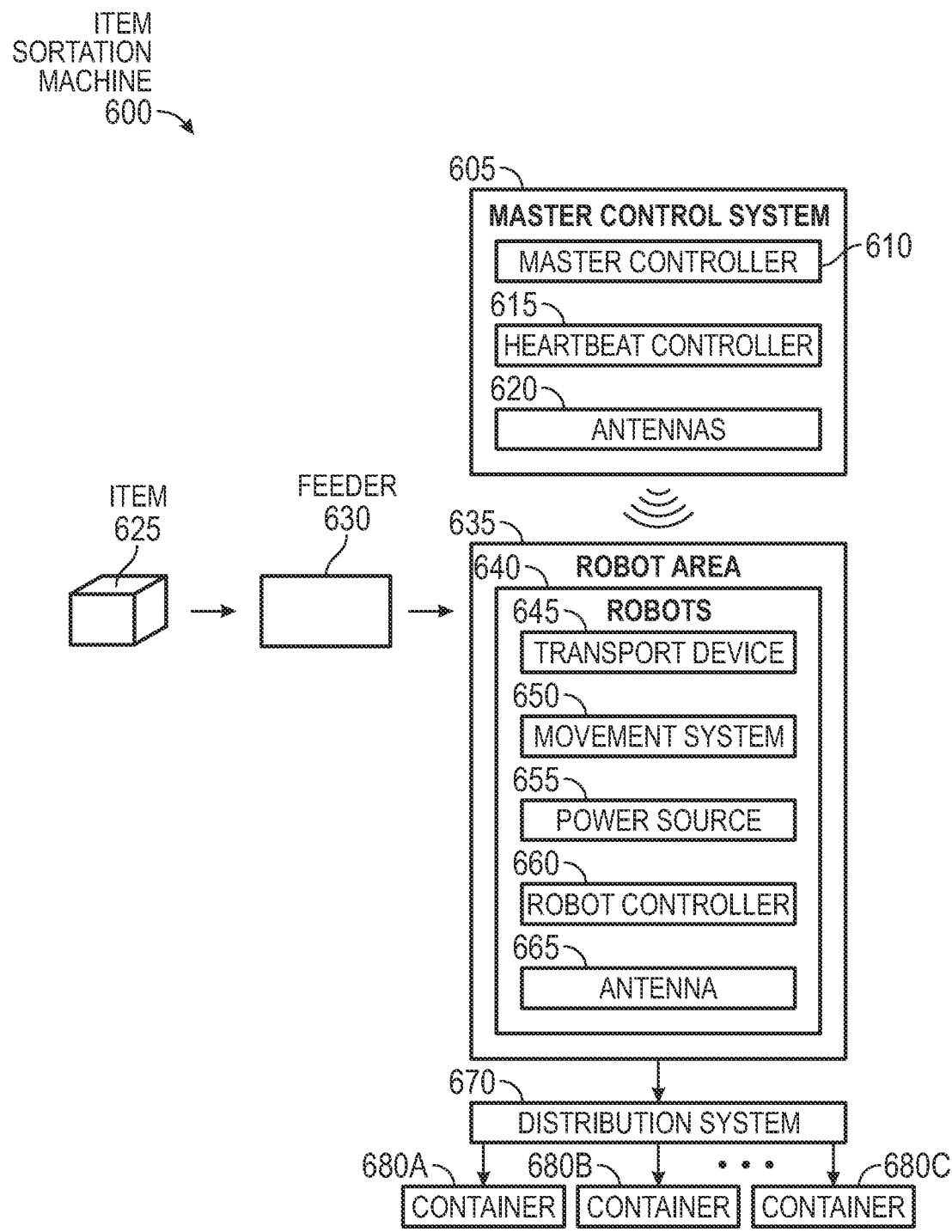
FIG. 6 illustrates an item-sortation machine, according to various embodiments.

FIG. 6 illustrates an item-sortation machine 600, according to various embodiments. In one embodiment, one or more of the item-sortation machines 600 is disposed inside one of the Faraday cages described above. Generally, the machine 600 sorts received items 625 into containers 680 using wirelessly controlled robots 640. However, the wireless communication techniques described herein are not limited to such and can be used in any wireless controlled machine (or robot(s)) such as a machine for moving containers or racks in a warehouse, removing an item from a package, packing an item into a shipping container, picking an item, and the like. The embodiments herein can be used in any machine that relies on wireless control signals which can interfere with other wireless controlled machines in a shared area (e.g., a warehouse, sorting facility, mail processing facility, packing facility, etc.).

The sortation machine 600 includes a master control system 605, a feeder 630, a robot area 635, and a distribution system 670. The master control system 605 provides the wireless control signals using a master controller 610 and antenna 620 (e.g., a transmit antenna) which control the actions of the robots 640 in the robot area 635. For example, the master control system 605 may wirelessly send move commands, pick-up commands, drop commands, stop commands, and the like which control how the robots 640 move themselves, and the item 625, in the robot area 635. The master control system 605 also includes a heartbeat controller 615 which uses the antennas 620 to transmit a wireless heartbeat (or E-stop) signal to the robots 640. In one embodiment, the robots 640 perform the commands received from the master controller 610 only as long as the heartbeat signal is received. That is, if the heartbeat controller 615 stops sending the heartbeat signal, the robots immediately stop (e.g., within a few millisecond) their current task. In one embodiment, the heartbeat signal is used to stop the robots 640 in the case of an emergency or a malfunction. Because the robots 640 could hurt a human near the machine 600 or damage the machine 600 during a malfunction, once an emergency is detected, the heartbeat controller 615 can deactivate the heartbeat signal which immediately stops the robots 640 to prevent harm to a human operator or the machine 600 itself. The heartbeat controller 615 may deactivate the heartbeat signal in response to a human operator pressing an emergency button, detecting a malfunctioning robot 640, sensor information (e.g., a vibration sensor), and the like. Once the emergency is handled, the heartbeat controller 615 can resume transmitting the heartbeat signal which indicates to the robots 640 they can begin to perform the commands received from the master controller 610.

In one embodiment, the master controller 610 and the heartbeat controller 615 include processors or micro-controllers. The master controller 610 and the heartbeat controller 615 can include solely hardware and firmware or can include combinations of hardware and software elements. Although not shown, the control system 605 can include master controllers 610 for multiple different machines 600. For example, the control system 605 can refer to multiple independently operating master controllers 610 for controlling respective machines 600, synchronized master controllers 610, or a single master controller 610 which controls multiple different machines 600.

The feeder 630 is a structure that moves the item 625 into the robot area 635. For example, the robot area 635 may be an enclosure that establishes an area where the robots 640 move. The feeder 630 may be a chute which slides the item 625 into a receiving area in the robot area 635, a conveyor belt which moves the packages into the area 635 (and can be connected to the conveyors illustrated in FIGS. 1 and 2), or a container in which a human places the items 625. In any case, the robots 640 can retrieve the item 625 once the item 625 arrives in the robot area 635 and use wireless messages received from the master control system 605 to move the item to the distribution system 670 where the item is stored in one of the containers 680.

The machine 600 can include any number of robots 640, e.g., one, two, three, four, etc. As shown, each robot 640 includes a transport device 645, a movement system 650, a power source 655, a controller 660, and at least one antenna 665. The transport device 645 permits the robot 640 to carry the item 625 to different locations in the robot area 635. For example, the robot area 635 may be a fenced off enclosure on the warehouse floor or a frame which includes tracks which the robots 640 can follow. The robots 640 can move along the floor and/or vertically using the frame. In another example, a portion of the robots 640 (or the entire robot) may remain stationary in the robot area 635. For instance, the base of the robot 640 may be anchored while an extension of the robot (e.g., a robotic arm) can move to pick up the items 625 and move them to different locations. The transport device 645 may include a claw or suction cup for lifting or picking the item 625. In another example, the transport device 645 may be a conveyor that receives the item 625 from a conveyor belt in the feeder 630. In another embodiment, the transport device 645 may be a bin in which the feeder 630 places the item 625.

The movement system 650 may move the entire robot 640 or a portion of the robot 640 within the robot area 635. For example, the movement system 650 may include wheels or bearings which permit the robot 640 to move along the floor or along tracks. In another example, the movement system 650 includes an arm attached to the transport device 645 to move the item 625. For example, the robot area 635 may include a central conveyor belt that moves received items 625 past the robots 640. The master controller 610 can instruct a selected one of the robots 640 to pick up the item 625 as it passes using the movement system 650 and the transport device 645 to place the item 625 into the distribution system 670.

The power source 655 in the robots 640 can be a battery or a capacitor. For example, the robots 640 may move relative short distances (e.g., less than 50 feet) before they return to recharge. In that case, the charge on a large capacitor (or capacitors) can be sufficient to move the robot 640 before the robot 640 returns to a charging station or rail to recharge the capacitor. The advantage of using a capacitor as the power source 655 is that it can provide high currents and recharge in a shorter time than a battery, although either is acceptable. In another example, if the entire robot 640 does not move within the robot area 635, then the robot can be connected to a power grid (e.g., plugged into a power outlet) where the power source 655 can be a power converter.

The robot controller 660 can be a processor or a microcontroller which receives commands from the master controller 610 using the antenna 665 and issues corresponding commands to the transport device 645 and movement system 650. For example, if the master controller 610 instructs the robot 640 to move the item 625 to a particular location in the robot area 635, the robot controller 660 in turn issues one or more commands to the movement system 650 to move the robot to the desired location. In one embodiment, in addition to receiving information from the master controller 610, the robot controller 660 can transmit information to the master controller 610. For example, the robot controller 660 may use the antenna 665 to inform the master controller 610 when a command has been completed successfully. The robot controller 660 may send other information wirelessly to the master controller 610 such as the charge on the power source 655, status of the transport device 645 or movement system 650 (if there is a malfunction or needs repair), if the item 625 was dropped, and the like. In one embodiment, the robot controller 660 may be entirely hardware, but in other embodiments may include a combination of hardware/firmware and software.

In one embodiment, the distribution system 670 receives the item 625 from the robot 640 and places the item 625 in one of the containers 680. The distribution system 670 may be multiple access apertures (e.g., a filing system) with corresponding chutes that lead to the containers 680. Using the transport devices 645, the robots 640 can move the items 625 through the apertures in the distribution system 670 and into the containers 680. In another example, the distribution system 670 may include fasteners or platforms for coupling the containers 680 to the distribution system 670. For instance, distribution system may form a rack on which the containers 680 are mounted. The robots 640 can travel to the portion of the rack that stores the corresponding container 680 for the package and place the item 625 into the container 680.

In one embodiment, the containers 680 are assigned different destinations either within the warehouse or to an external location (e.g., a different warehouse or mailing code). Moreover, the containers 680 may correspond to different shipping companies. In one embodiment, the master controller 610 knows the desired destination of the items 625, which may be determined by scanning a bar code or reading an RFID tag on the item 625 when in the feeder 630. The master controller 610 can then provide instructions to the robots 640 to move the item 625 to the appropriate location in distribution system 670 such that the item 625 is stowed in the container 680 corresponding to its destination. In this manner, the item-sortation machine 600 can provide wireless commands to the robots 640 for sorting received items 625 into the containers 680.

Figure 7:
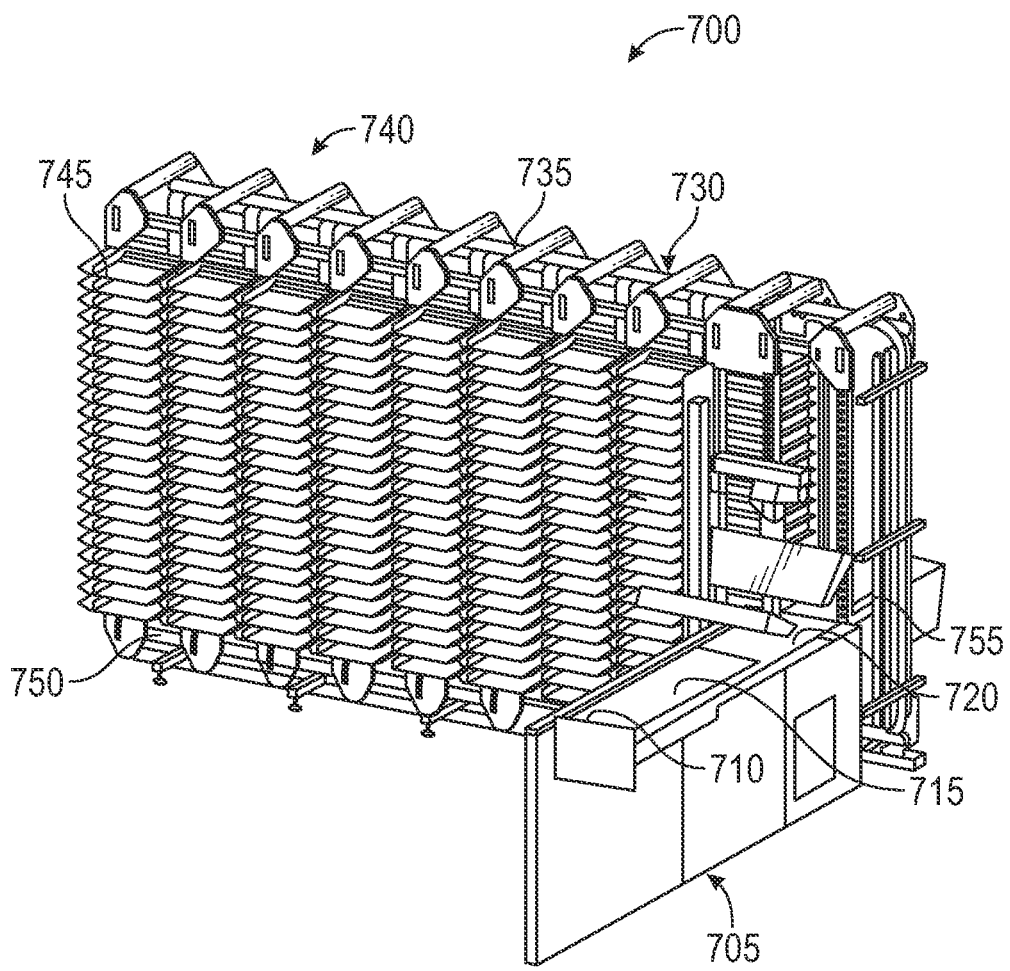
FIGS. 7 and 8 illustrate an apparatus for sorting items, according to various embodiments.
Figure 8:
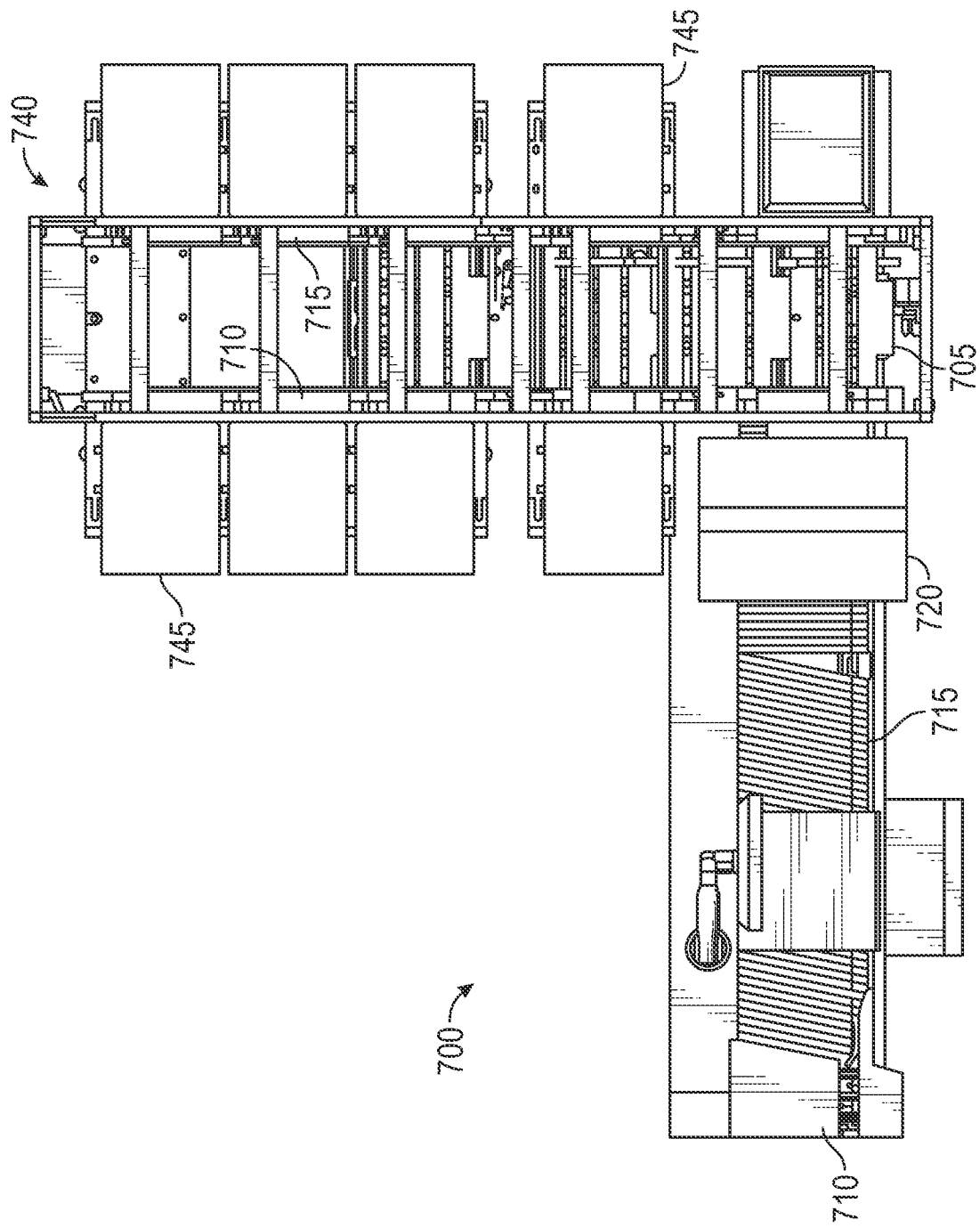

Referring now to FIGS. 7 and 8, an apparatus which is one example of an item sortation machine 600 shown in FIG. 6 for sorting items such as documents or mail pieces is designated generally 700 which may be disposed in the Faraday cages described above. The system 700 includes a plurality of delivery cars 805 (e.g., the robots 640 shown in FIG. 6) to deliver items (e.g., item 625) to a plurality of sort locations, such as output bins 745 (e.g., containers 680). At a loading station 755, each car 805 receives an item from an input station 705 and delivers it to the appropriate bin.

The cars 805 travel along a track 730 to the sort locations. The track has a horizontal upper rail 735 and a horizontal lower rail 750, which operates as a return leg. A number of parallel vertical track legs extend between the upper rail 735 and the lower return rail 750. In the present instance, the bins 745 are arranged in columns between the vertical track legs.

After a piece is loaded onto a car, the car travels upwardly along two pairs of vertical tracks legs and then horizontally along two upper tracks 735. The car 805 travels along the upper rail until it reaches the appropriate column containing the bin for the piece that the car is carrying. The car 805 then discharges the piece into the bin using a transport device or system.

After discharging the piece, the car 805 continues down the vertical legs of the column until it reaches the lower rail 750 which the car follows until returning to the loading station 755 to receive another item.

The cars 805 are semi-autonomous vehicles that each has an onboard power source (e.g., power source 655) and an onboard motor (e.g., a movement system 650) to drive the cars along the track 730. The cars also include a loading/unloading mechanism (e.g., the transport device 645), such as a conveyor, for loading pieces onto the cars and discharging the pieces from the cars.

Since the system 700 includes a number of cars 805, the positioning of the cars is controlled using, e.g., the collision avoidance techniques described above to ensure that the different cars do not crash into each other. Further, the control system may output a heartbeat signal, e.g., using a heartbeat controller 615. The cars 805 perform the commands to move the pieces throughout the system 700 so long as the heartbeat signal is active as described above.

At the input station 705, the mail pieces are separated from one another so that the pieces can be conveyed serially to the loading station 755 to be loaded onto the cars 805. Additionally, at the input station information is determined for each piece using, for example, a bar code scanner or a mailing address so that the piece can be sorted to the appropriate bin.

A variety of configurations may be used for the input station, including manual or automatic configurations or a combination of manual and automated features. In a manual system, the operator enters information for each piece and the system sorts the mail piece accordingly. In an automatic system, the input system includes elements that scan each mail piece and detect information regarding each piece. The system then sorts the mail piece according to the scanned information.

In an exemplary manual configuration, the input system includes a work station having a conveyor, an input device, and a monitor. The operator reads information from a mail piece and then drops the piece onto a conveyor that conveys the piece to the loading station 755.

In an exemplary automatic configuration, the system includes an imaging station, having an imaging device such as a high speed line scanning camera. In one example, the imaging station scans a bar code on each mail piece to detect information regarding the destination for each piece. The system analyzes the image data to determine the destination information and then controls the cars to move the piece into a bin corresponding to the destination.

FIGS. 7 and 8 illustrate such an automated system. A feeder 710 in the input bin serially feeds mail pieces from the input bin to a conveyor 715. An imaging station 720 positioned along the conveyor scans the mails pieces as the pieces are conveyed to the loading station 755. The system 700 analyzes a bar code or mailing address to read information for the mail piece.

The conveyor 715 conveys the mail piece to the loading station 755 where it is loaded onto a car 805.

The input station 705 may be configured in a wide range of options. The options are not limited to those configurations described above, and may include additional features, such as an automated scale for weighing each piece, a labeler for selectively applying labels to the mail pieces and a printer for printing information on the mail pieces or on the labels.

In one embodiment, the system 700 includes a plurality of input stations which may increase the feed rate of pieces. In addition, the input stations may be configured to process different types of items. In this way, each input station could be configured to efficiently process a particular category of items. For instance, if the system is configured to process documents, such as mail, one input station may be configured to process standard envelopes, while another input station may be configured to process larger mails, such as flats. Similarly, one input station may be configured to automatically process mail by scanning it and automatically determining the recipient. The second input station may be configured to process rejects, such as by manually keying in information regarding the recipient.

The system includes a sorting station 740 which includes an array of bins 745 for receiving the pieces. Additionally, the sorting station 740 includes the track 730 for guiding the cars 805 to the bins 745.

In one embodiment, during transport, the cars travel up a pair of vertical legs from the loading station 755 to the upper rail 735 as dictated by a predefined path (in one example, the cars actually travel up two pairs of rails because the track includes a forward track and a parallel opposing track). The car then travels along the upper rail until reaching the column having the appropriate bin. The car then travels downwardly along two front vertical posts and two parallel rear posts until reaching the appropriate bin, and then discharges the mail piece into the bin. According to the predefined path, the car then continues down the vertical legs until reaching the lower horizontal rail 750. The car then follows the lower rail back toward the loading station.

As can be seen in FIG. 8, the track 730 includes a front track 810 and a rear track 815. The front and rear tracks 810, 815 are parallel tracks that cooperate to guide the cars around the track. In one embodiment, each of the cars includes four wheels: two forward wheel and two rearward wheels. The forward wheels ride in the front track, while the rearward wheels ride in the rear track. It should be understood that in the discussion of the track the front and rear tracks 810, 815 are similarly configured opposing tracks that support the forward and rearward wheels of the cars. Accordingly, a description of a portion of either the front or rear track also applies to the opposing front or rear track.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
    a first Faraday cage defining a first aperture through which a first conveyor extends;
    a first wirelessly controlled machine disposed in the first Faraday cage, wherein the first wirelessly controlled machine is configured to transmit control signals using a first frequency range;
    a second Faraday cage defining a second aperture through which a second conveyor extends; and
    a second wirelessly controlled machine disposed in the second Faraday cage, wherein the second wirelessly controlled machine is configured to transmit control signals using the first frequency range,
    wherein a portion of at least one of the first Faraday cage and the second Faraday cage is disposed between the first and second apertures.

2. The system of claim 1, wherein the portion of at least one of the first Faraday cage and the second Faraday cage blocks wireless signals in the first frequency range from passing between the first and second apertures.

3. The system of claim 1, wherein the first aperture is disposed on a first side of the first Faraday cage that has a non-facing relationship with a first side of the second Faraday cage containing the second aperture.

4. The system of claim 1, further comprising:
a third wirelessly controlled machine disposed in the first Faraday cage and coupled to the first conveyor, wherein the third wirelessly controlled machine is configured to transmit control signals using a second frequency range.

5. The system of claim 4, further comprising:
a first distribution system coupled between the first conveyor and the first and third wirelessly controlled machines, wherein the first distribution system is configured to selectively route items received on the first conveyor to the first and third wirelessly controlled machines.

6. The system of claim 5, further comprising:
a fourth wirelessly controlled machine disposed in the second Faraday cage and coupled to the second conveyor, wherein the fourth wirelessly controlled machine is configured to transmit control signals using the second frequency range.

7. The system of claim 6, further comprising:
a second distribution system coupled between the second conveyor and the second and fourth wirelessly controlled machines, wherein the second distribution system is configured to selectively route items received on the second conveyor to the second and fourth wirelessly controlled machines.

8. The system of claim 1, wherein the first wirelessly controlled machine comprises a first plurality of wirelessly controlled robots configured to retrieve first items transported by the first conveyor and sort the first items into a first plurality of containers based on control signals transmitted on the first frequency range, and
wherein the second wirelessly controlled machine comprises a second plurality of wirelessly controlled robots configured to retrieve second items transported by the second conveyor and sort the second items into a second plurality of containers based on control signals transmitted on the first frequency range.

9. A method, comprising:
operating a first wirelessly controlled machine disposed in a first Faraday cage using a first frequency range, wherein the first Faraday cage defines a first aperture through which a first conveyor extends; and
operating a second wirelessly controlled machine disposed in a second Faraday cage using the first frequency range, wherein the second Faraday cage defines a second aperture through which a second conveyor extends,
wherein a portion of at least one of the first Faraday cage and the second Faraday cage is disposed between the first and second apertures.

10. The method of claim 9, wherein the portion of at least one of the first Faraday cage and the second Faraday cage blocks wireless signals in the first frequency range from passing between the first and second apertures.

11. The method of claim 9, wherein the first aperture is disposed on a first side of the first Faraday cage that has a non-facing relationship with a first side of the second Faraday cage containing the second aperture.

12. The method of claim 9, further comprising:
operating a third wirelessly controlled machine disposed in the first Faraday cage using a second frequency range.

13. The method of claim 12, further comprising:
routing items received on the first conveyor to the first and third wirelessly controlled machines using a first distribution system coupled between the first conveyor and the first and third wirelessly controlled machines.

14. The method of claim 13, further comprising:
operating a fourth wirelessly controlled machine disposed in the second Faraday cage using the second frequency range.

15. The method of claim 14, further comprising:
routing items received on the second conveyor to the second and fourth wirelessly controlled machines using a second distribution system coupled between the second conveyor and the second and fourth wirelessly controlled machines.

16. The method of claim 9, wherein the first wirelessly controlled machine comprises a first plurality of wirelessly controlled robots that retrieve first items transported by the first conveyor and sort the first items into a first plurality of containers based on control signals transmitted on the first frequency range, and
wherein the second wirelessly controlled machine comprises a second plurality of wirelessly controlled robots that retrieve second items transported by the second conveyor and sort the second items into a second plurality of containers based on control signals transmitted on the first frequency range.

17. A system, comprising:
a first Faraday cage defining a first aperture;
a first wirelessly controlled machine disposed in the first Faraday cage, wherein the first wirelessly controlled machine is configured to transmit control signals using a first frequency range;
a second Faraday cage defining a second aperture; and
a second wirelessly controlled machine disposed in the second Faraday cage, wherein the second wirelessly controlled machine is configured to transmit control signals using the first frequency range,
wherein a portion of at least one of the first Faraday cage and the second Faraday cage is disposed between the first and second apertures.

18. The system of claim 17, wherein the portion of at least one of the first Faraday cage and the second Faraday cage blocks wireless signals in the first frequency range from passing between the first and second apertures.

19. The system of claim 17, wherein the first aperture is disposed on a first side of the first Faraday cage that has a non-facing relationship with a first side of the second Faraday cage containing the second aperture.

20. The system of claim 17, further comprising:
a third wirelessly controlled machine disposed in the first Faraday cage, wherein the third wirelessly controlled machine is configured to transmit control signals using a second frequency range; and
a fourth wirelessly controlled machine disposed in the second Faraday cage, wherein the fourth wirelessly controlled machine is configured to transmit control signals using the second frequency range.

* * * * *